(12) United States Patent
Binello et al.

(10) Patent No.: US 7,901,308 B2
(45) Date of Patent: Mar. 8, 2011

(54) PULLEY FOR A CONTINUOUSLY VARIABLE TRANSMISSION

(75) Inventors: Domenico Binello, Cortandone (IT); Gianluca Cariccia, Romano Canavese (IT); Alessio Galletti, Soianna (IT)

(73) Assignee: DAYCO EUROPE S.r.l. con Unico Socio, Chieti (IT)

( * ) Notice: Subject to any disclaimer, the term of this patent is extended or adjusted under 35 U.S.C. 154(b) by 999 days.

(21) Appl. No.: 10/554,319

(22) PCT Filed: Apr. 23, 2004

(86) PCT No.: PCT/IT2004/000231
§ 371 (c)(1),
(2), (4) Date: Nov. 28, 2006

(87) PCT Pub. No.: WO2004/094874
PCT Pub. Date: Nov. 4, 2004

(65) Prior Publication Data
US 2007/0105671 A1      May 10, 2007

(30) Foreign Application Priority Data
Apr. 23, 2003   (IT) .............................. TO2003A0314

(51) Int. Cl.
*F16H 59/00* (2006.01)
(52) U.S. Cl. ..................... 474/19; 474/8; 474/21; 474/10
(58) Field of Classification Search ................. 474/8–46; 192/110 R
See application file for complete search history.

(56) References Cited

U.S. PATENT DOCUMENTS

| 4,075,902 | A |   | 2/1978  | Charchian et al. |
| 5,403,240 | A | * | 4/1995  | Smith et al. ....................... 474/8 |
| 5,497,679 | A | * | 3/1996  | Mitchell et al. ................. 74/567 |
| 5,497,735 | A | * | 3/1996  | Kern et al. .................... 123/90.6 |
| 5,647,810 | A | * | 7/1997  | Huddleston .................... 474/14 |
| 5,797,180 | A | * | 8/1998  | Buchholz ..................... 29/888.1 |
| 5,967,286 | A | * | 10/1999 | Hokanson et al. ........ 192/110 R |

FOREIGN PATENT DOCUMENTS
EP         1 227 267       7/2002
TW         125357         12/1989

OTHER PUBLICATIONS
Patent Abstracts of Japan, vol. 1998, No. 13, Nov. 13, 1998.
Patent Abstracts of Japan, vol. 1998, No. 11, Sep. 30, 1998.
Translation of related Taiwanese Office Action providing the relevance of document BA.

* cited by examiner

*Primary Examiner* — Bradley T King
*Assistant Examiner* — James K Hsiao
(74) *Attorney, Agent, or Firm* — Venable LLP; Robert Kinberg; Justine A. Gozzi

(57) ABSTRACT

A pulley for a continuously variable transmission is provided with a fixed half-pulley fitted on a supporting shaft and a mobile half-pulley, which is able to slide towards the fixed half-pulley under the thrust of a spring, so as to define a V-shaped race of variable amplitude. The pulley is further provided with a device for compensating the axial thrust, said device being constituted by a cam and a cam follower, which are coupled in contact with one another to impart an additional axial thrust on the mobile half-pulley in response to a torque acting on the pulley. The cam is defined by a tubular body made of plastic material co-moulded on the supporting shaft, whilst the cam follower is made of a single piece with the mobile half-pulley.

11 Claims, 2 Drawing Sheets

`US 7,901,308 B2`

PULLEY FOR A CONTINUOUSLY VARIABLE TRANSMISSION

TECHNICAL FIELD

The present invention relates to a pulley for a continuously variable transmission (CVT).

BACKGROUND ART

Known to the art are drives comprising a driving pulley and a driven pulley formed by respective pairs of half-pulleys, which define respective races in which a V-shaped drive belt is wound. The axial amplitude of the race of the driving pulley is adjusted by a mechanical-control device with centrifugal action, whilst the driven pulley is normally of a reactive type, i.e., is able to adapt automatically the axial amplitude of its own race in an opposite way to what occurs for the driving pulley, to vary the diameters of winding of the belt.

In particular, for the driven pulley one of the half-pulleys is fitted in a fixed position on a drive shaft, whilst the other half-pulley is mobile towards the fixed half-pulley under the axial thrust exerted by a pre-loaded spring. The two half-pulleys are constrained together, not only by the spring but also by a device for compensating the axial thrust, which is sensitive to the torque and comprises a cam and a cam follower, which are carried by the fixed half-pulley and the mobile half-pulley, respectively, and are coupled together to provide an additional component of axial load when the drive is in the acceleration or deceleration phase.

The technique is known of making the cam and the cam follower as distinct bodies to be connected to the fixed half-pulley and, respectively, to the mobile half-pulley, for example by operations of welding or bonding.

The driven pulleys of a known type described above are in general far from satisfactory in that they are made up of a relatively large number of components and require times and hence costs for assembly that are relatively high. The drawback outlined above is basically due to the fact that the cam, the cam follower and the two half-pulleys are built using moulding processes that are separate from one another and they must be assembled together by means of a relatively large number of operations of relative positioning and connection.

EP-A-1 227 267 discloses a driven pulley having a fixed half-pulley and a mobile half-pulley as described above, wherein the fixed half-pulley in connectable to the support shaft by means of a centrifugal clutch. The driven pulley includes a device for compensating axial thrust consisting of individual cams overmoulded on a support disc that is part of the clutch and is rigidly connected to the fixed pulley, and of cam followers integral to the mobile half-pulley. To support the overmoulded cams, sheet metal inserts are provided onto the support disc.

This structure is not free form the above-referenced problems because the driven pulley is relatively complex, has a high number of pieces and entails high manufacturing costs.

DISCLOSURE OF INVENTION

The purpose of the present invention is to provide a pulley for a CVT which will enable the problems outlined above to be overcome in a simple and inexpensive way and preferably will present a high degree of efficiency in the aforesaid device for compensating axial thrust.

According to the present invention, there is provided a pulley for a CVT, the said pulley comprising:

a supporting shaft;
a fixed half-pulley, which is coaxial to said supporting shaft;
a mobile half-pulley, which is coaxial to said supporting shaft and is able to slide towards said fixed half-pulley so as to define with the latter a race of variable amplitude designed to be engaged by a belt of said drive; and
a device for compensating axial thrust, comprising first cam means and second cam means, which are carried by said fixed half-pulley and said mobile half-pulley, respectively, and are coupled in contact with one another in order to generate an axial thrust on said mobile half-pulley in the direction of compression of said belt in response, in use, to a torque acting on said pulley;

said pulley being characterized in that said fixed half-pulley is fixed to said supporting shaft, and in that said first cam means are defined by a single tubular body made of plastic material co-moulded on said supporting shaft. Preferably, said second cam means are defined by at least one cam-follower portion made of a single piece with said mobile half-pulley.

BRIEF DESCRIPTION OF THE DRAWINGS

The present invention will now be described with reference to the annexed drawings, which illustrate a non-limiting example of embodiment thereof, and in which.

BEST MODE FOR CARRYING OUT THE INVENTION

Figure 1:
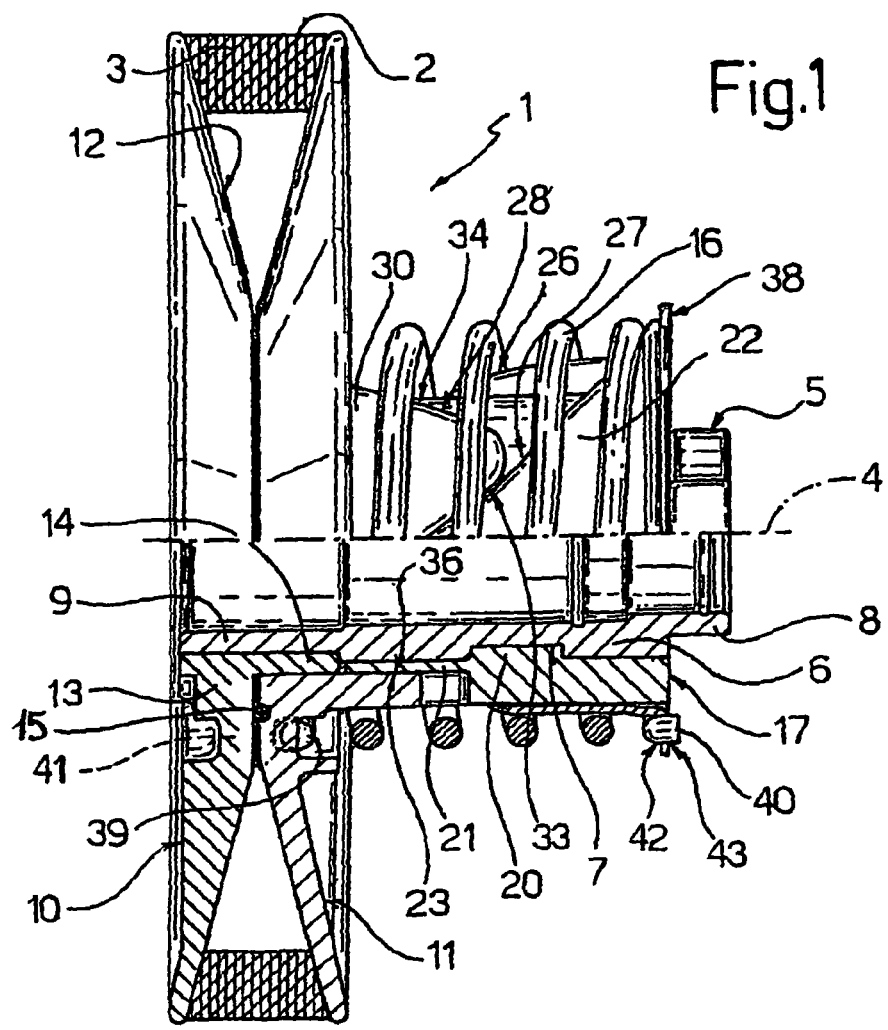
FIG. 1 is a side view of a preferred embodiment of the pulley for a CVT according to the present invention, for one half illustrated in cross-sectional view according to a diametral plane.

With reference to FIG. 1, the reference number 1 designates, as a whole, a driven pulley for a CVT 2 (partially illustrated), which comprises a drive pulley (not illustrated) and a V-belt 3 wound on the drive pulley and driven pulley.

The drive pulley is controlled in a known way (not described in detail herein) by a centrifugally acting mechanical control device (not illustrated) for varying, in use, the winding diameter of the belt 3 according to the speed of rotation, whilst the pulley 1 is of the reactive type, i.e., it automatically adapts its own winding diameter inversely to the diameter of the drive pulley.

The pulley 1 has an axis 4 and comprises a hollow supporting shaft 5, which in turn comprises an intermediate axial portion 6 defining on its own outer surface a plurality of retention seats 7. The shaft 5 further comprises two cylindrical terminal portions 8, 9, set on axially opposite sides of the portion 6, and is designed to be connected to a driven transmission member (not illustrated) in a position corresponding to the portion 8.

Once again with reference to FIG. 1, the pulley 1 further comprises two half-pulleys 10, 11, which are coaxial to the shaft 5, axially face one another, and define between them a V-shaped race 12 engaged by the belt 3.

The half-pulley 10 has a hub 13 made of a single piece, which comprises a cylindrical collar 14 projecting axially towards the portion 8 and is fitted on the portion 9, for example by welding, interference or key fit, so that the half-pulley 10 is fixed to the shaft 5 and hence is commonly referred to as "fixed half-pulley".

The half-pulley 11, instead, is commonly referred to as "mobile half-pulley" in so far as it slides towards the half-pulley 10 under the thrust of an axially pre-loaded spring 16 for automatically varying the axial amplitude of the race 12 in a way inverse to what occurs for the drive pulley.

Conveniently, the mobile half-pulley 11 carries a low-friction spacer ring 15 fitted to a front surface thereof in a position radially internal with respect to race 12 and facing the fixed half-pulley 10, so as to define with the fixed half-pulley 10 a relative axial stop position in which the axial amplitude of race 12 is minimum.

Figure 2:
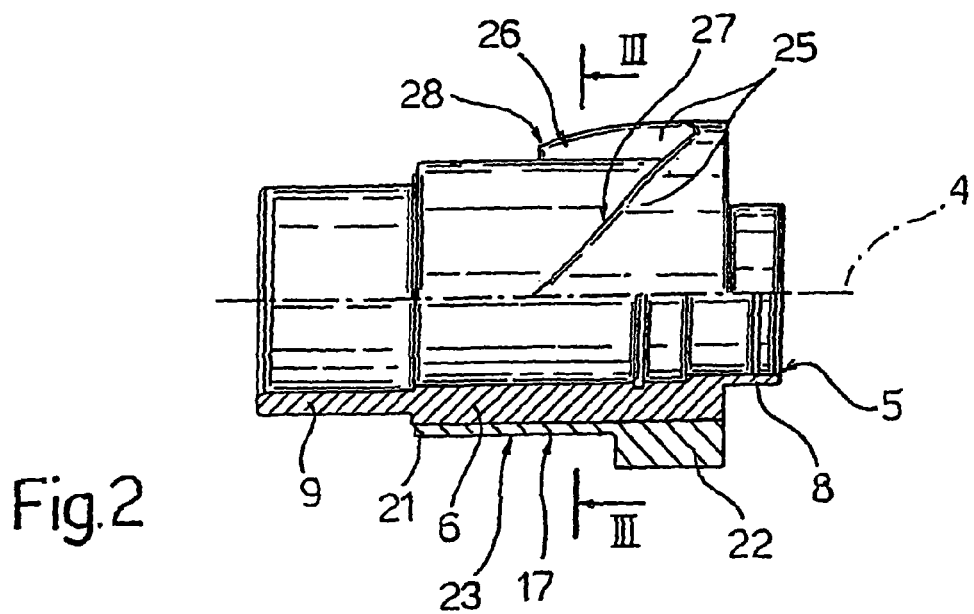
FIG. 2 is similar to FIG. 1 and illustrates a detail of the pulley of FIG. 1.
Figure 3:
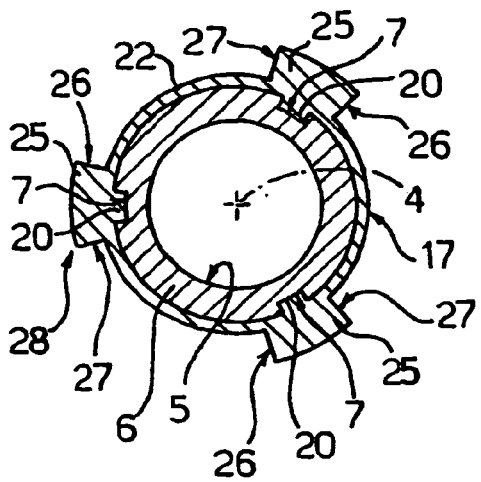
FIG. 3 is a cross-sectional view according to the line III-III of FIG. 2.
Figure 4:
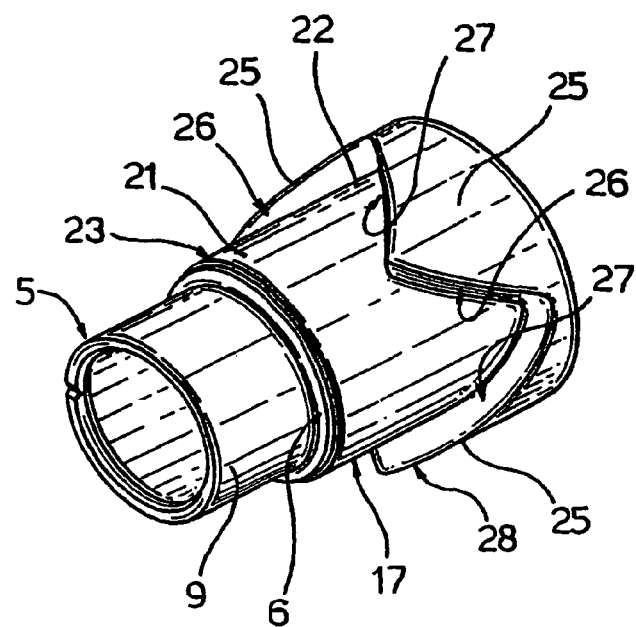
FIG. 4 is a perspective view of the detail of FIG. 2.

With reference to FIGS. 1 to 3, the pulley 1 further comprises a tubular body 17, which is made of plastic material, preferably with glass-fibre fillers and/or with a fluorured filler material, for example a material commonly known as "Teflon" (registered trade mark), and is obtained by co-moulding in a single piece on the portion 6.

The body 17 carries, in cantilever fashion, a plurality of internal radial appendages 20, which each engage a corresponding seat 7 and comprises two opposed terminal stretches 21, 22, of which the stretch 21 is set axially alongside the collar 14 and is delimited radially by an external cylindrical surface 23.

The stretch 22, instead, defines a cam, which projects radially with respect to the surface 23 and, with particular reference to FIG. 3, comprises three teeth 25 facing axially in the direction of the half-pulleys 10, 11, each of which is delimited circumferentially by a corresponding pair of sides 26, 27.

Figure 5:
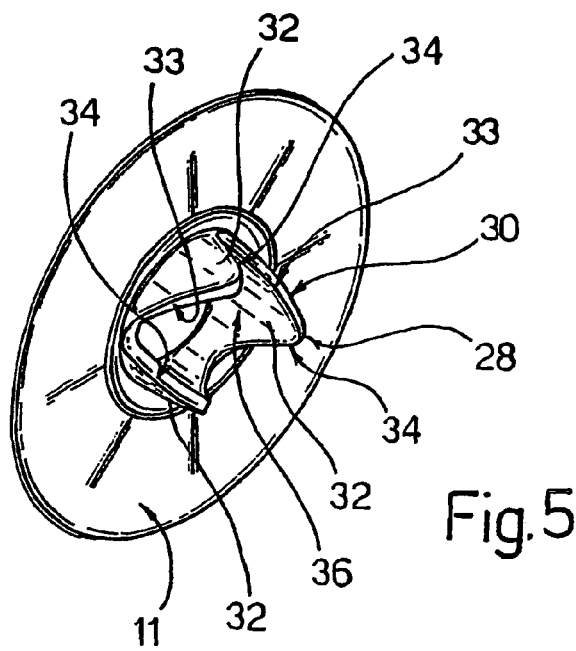
FIG. 5 is a perspective view, at a reduced scale, of a further detail of FIG. 1.

According to what is illustrated in FIGS. 1 and 5, the cam 22 forms part of a device 28 for compensating the axial thrust, which is sensitive to the torque to provide a component of axial load on the half-pulley 11, which is additional to the load exerted by the spring 16, and hence to increase the compression on the sides of the belt 3 when the transmission is in the acceleration or deceleration phase.

The device 28 comprises a cam-follower portion 30, which is made of a single piece with the half-pulley 11, preferably made of aluminium, and comprises, in the particular example illustrated, three teeth 32 (see FIG. 5) interspaced between the teeth 25 and each delimited circumferentially by a corresponding pair of sides 33, 34, which co-operate by sliding contact, in use, against the sides 26, 27 in the presence of a driving or braking torque acting on the pulley 1.

The cam-follower portion 30 also defines part of the hub of the half-pulley 11 and is delimited radially by the cylindrical internal surface 36 fitted by sliding contact to the surface 23 in such a way as to be supported and guided by the stretch 21 in sliding away from and towards the half-pulley 10. At the same time, the surface 36 is fitted to the collar 14 with radial play (not visible in FIG. 1 on account of the small scale of illustration) in such a way as to limit friction against the collar 14 itself during sliding on the stretch 21.

Once again according to what is illustrated in FIG. 1, the spring 16 is fitted around the body 17 and is set axially between the half-pulley 11 and an annular contrast element, which is fixed to the axial end of the stretch 22, for example by clinching. In the particular example described, the spring 16 is pre-loaded torsionally, as well as axially, in such a way as to maintain the sides 34, 26 or else the sides 33, 27 coupled to one another when the pulley 1 is set in a resting condition.

Torsional pre-loading is obtained by setting two opposite ends 39, 40 of the spring 16 so that they bear upon respective circumferential shoulders 41, 42 provided on the half-pulley 11 and on the element 38, respectively.

In particular, the end 40 is bent to form an L shape, whilst the element 38 has a ring of axial holes 43 (only one of which is illustrated), which each define a corresponding shoulder 42, are set at an angular distance apart from one another and may be engaged, in a selective way, by the end 40 so as to enable adjustment of the torsional pre-load of the spring 16.

During fabrication of the pulley 1, the body 17 is formed in a corresponding mould by setting the shaft 5 in the mould itself and co-moulding the plastic material directly on the portion 6. After the cam-follower portion 30 has been made of a single piece with the half-pulley 11, the latter is slidably fitted on the stretch 21. Next, the half-pulley 10 is fixed to the portion 9, whilst the spring 16 is then fitted around the body 17, is axially blocked by fixing the element 38 on the body 17, and finally is torsionally pre-loaded by setting the end 39 against the shoulder 41 and the end 40 in the appropriate hole 43 for obtaining the desired torsional pre-loading.

In use, operation of the device 28 is similar to that of known solutions. In particular, in the presence of a driving torque, i.e., in the acceleration phase, the half-pulley 11 tends to "anticipate" the half-pulley 10, in that the latter is subject to the inertia of the driven masses, whilst, in the presence of a braking torque, i.e., in the deceleration phase, the half-pulley 11 is braked by the belt 3 and tends to "be retarded" with respect to the half-pulley 3. On account of the relative rotation between the half-pulleys 10 and 11 the sides 34, 26 or else the sides 33, 27 co-operate with one another and impart on the half-pulley 11 an axial thrust to bring about a further compression of the belt 3 and thus prevent any slipping of the belt 3 itself.

According to a preferred embodiment, the sides of the cam 22 and of the cam-follower portion 30 are shaped so as to obtain a behaviour of the device 28 in the acceleration phase different from the one obtained in the deceleration phase.

From the foregoing description, it emerges clearly that the pulley 1 has a relatively low number of components and requires a relatively contained number of assembly operations thanks to its constructional characteristics. In fact, the cam 22 is made by co-moulding with the half-pulley 10, and the cam-follower portion 30 is made of a single piece with the half-pulley 11 so that there is no need for any operations of connection to the half-pulleys 10, 11 themselves. Engagement, then, of the appendages 20 in the seats 7 enables the fit between the body 17 and the shaft 5 to remain firm over time.

The overall dimensions (in particular the axial dimensions) of the pulley 1 are reduced as compared known solutions in so far as no connection elements are envisaged between the half-pulley 10 and the cam 22 and between the half-pulley 11 and the cam-follower portion 30.

The device 28 provides a high degree of efficiency and, in particular, low response times in so far as the actions of friction present during sliding of the half-pulley 11 are relatively low. This result is obtained basically by the fact that the half-pulley 11 is relatively light since it is made of aluminium and does not come into contact with the collar 14, which is generally made of metal material, but only with the plastic material of the stretch 21, which defines a supporting bushing of a self-lubricating type since it contains a Teflon filler.

The efficiency of the device 28 is further increased by the torsional pre-loading of the spring 16.

Finally, from the foregoing description it is evident that modifications and variations may be made to the pulley 1 described and illustrated herein with reference to the attached figures, without thereby departing from the sphere of protection of the present invention.

In particular, the components of the pulley 1 could be made of materials different from the ones described herein purely by way of non-limiting example, and/or the cam 22 and the cam follower 30 could have profiles different from the ones illustrated, and/or the cam 22 could be constituted by more than just one body made of plastic material co-moulded on the shaft 5.

The invention claimed is:

1. A pulley for a continuously variable transmission, the pulley comprising:
    a supporting shaft;
    a fixed half-pulley, wherein the fixed half-pulley is coaxial and fixed to said supporting shaft;
    a mobile half-pulley, wherein the mobile half-pulley is coaxial to said supporting shaft and is slidable with respect to said fixed half-pulley, the fixed and mobile half-pulleys defining a race of variable amplitude and the race being engageable by a belt of a drive; and
    a device for compensating the axial thrust, the device comprising a first cam and a second cam, wherein said fixed half-pulley and said mobile half-pulley are rigidly connected to the first cam and the second cam respectively, said first and second cam being in contact with one another to impart an additional axial thrust on said mobile half-pulley in a direction of compression of said belt in response, in use, to a torque acting on said pulley; wherein said fixed half-pulley is fixed to said supporting shaft, and wherein said first cam is defined by a single tubular body made of plastic material co-moulded on said supporting shaft, said body being made of plastic material forming a supporting bushing on which said mobile half-pulley is slidably fitted.

2. The pulley according to claim 1, wherein said second cam comprises a cam-follower portion made of a single piece with said mobile half-pulley.

3. The pulley according to claim 2, wherein the mobile half-pulley and said cam-follower portion are made of aluminium.

4. The pulley according to claim 1, wherein said supporting bushing is made of a self-lubricating material.

5. The pulley according to claim 1, wherein said mobile half-pulley is coupled to said fixed half-pulley with radial play.

6. The pulley according to claim 1, further comprising:
    an elastic element axially pre-loaded for pushing said mobile half-pulley towards said fixed half-pulley; and a positioning device for pre-loading torsionally said elastic element.

7. The pulley according to claim 6, wherein the positioning device further comprises an adjustment device for varying the torsional pre-loading of said elastic element.

8. The pulley according to claim 7, wherein the adjustment device is carried by an element of axial pre-loading of said elastic element.

9. The pulley according to claim 8, wherein the element of axial pre-loading includes a ring of holes and the elastic element comprises a helical spring; the ring of holes being set at an angular distance apart from one another and selectively engageable by one end of said helical spring.

10. The pulley according to claim 1, wherein the pulley further comprises at least one retention seat made in one of said supporting shaft or said body made of plastic material, and at least one appendage, which is carried by the other one of said supporting shaft or said body made of plastic material and engages said retention seat.

11. The pulley according to claim 1, further comprising a spacer ring carried by one of said half-pulleys and fitted to a front surface thereof in a position radially internal with respect to said race and facing the other of said half-pulleys.

* * * * *

UNITED STATES PATENT AND TRADEMARK OFFICE
CERTIFICATE OF CORRECTION

| | | |
|---|---|---|
| PATENT NO. | : 7,901,308 B2 | Page 1 of 1 |
| APPLICATION NO. | : 10/554319 | |
| DATED | : March 8, 2011 | |
| INVENTOR(S) | : Domenico Binello et al. | |

It is certified that error appears in the above-identified patent and that said Letters Patent is hereby corrected as shown below:

On the cover page:

(75) Inventors, at line 3, change "Soianna" to -- Soiana --.

Signed and Sealed this
Twenty-third Day of August, 2011

David J. Kappos
*Director of the United States Patent and Trademark Office*